Figure 1:
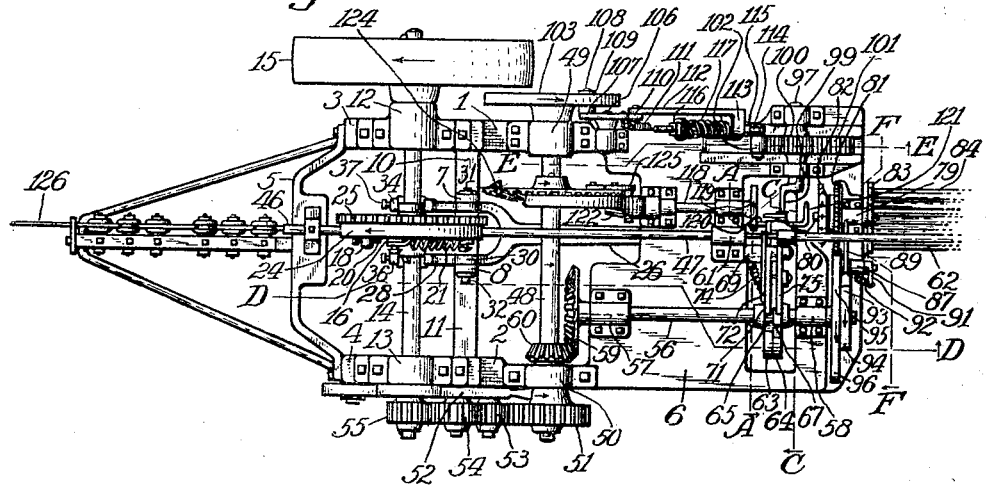

C. A. PORATH.
BALE TIE MACHINE.
APPLICATION FILED MAR. 29, 1915.

1,198,761.

Patented Sept. 19, 1916.

3 SHEETS—SHEET 1.

WITNESSES:
J. H. Gardner.
M. E. Sparrow.

INVENTOR:
Carl A. Porath,
BY
E. D. Silvius,
ATTORNEY.

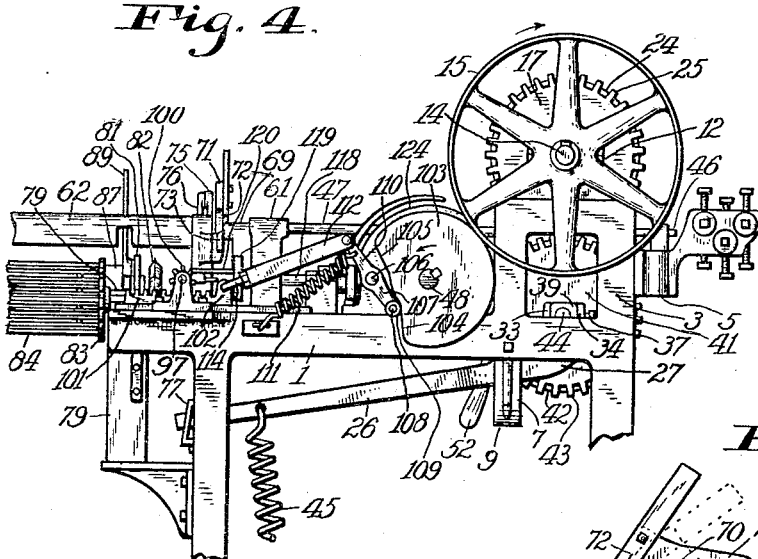

C. A. PORATH.
BALE TIE MACHINE.
APPLICATION FILED MAR. 29, 1915.
1,198,761. Patented Sept. 19, 1916.
3 SHEETS—SHEET 3.
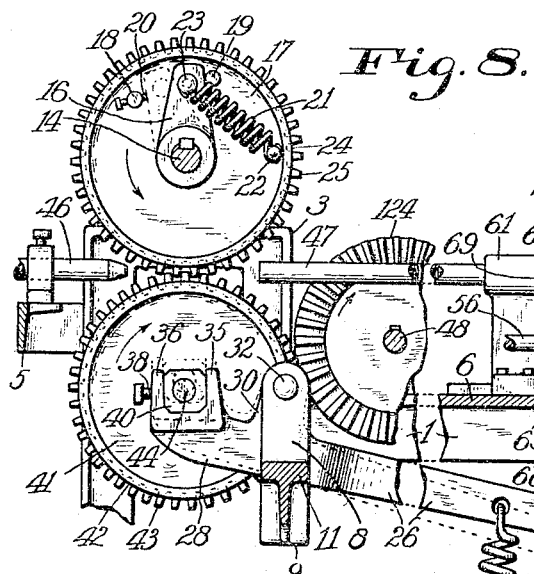
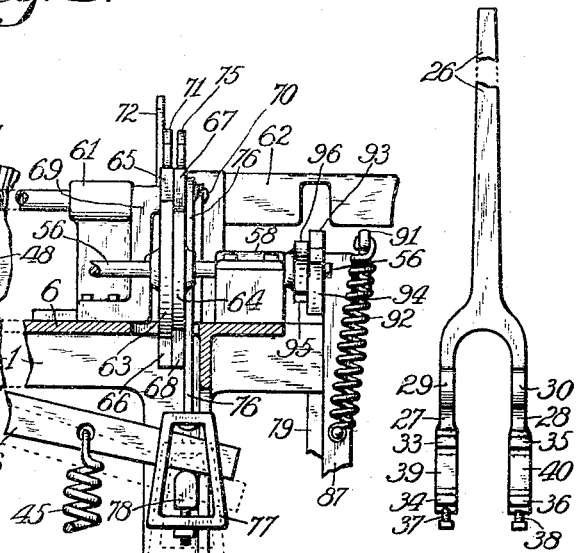
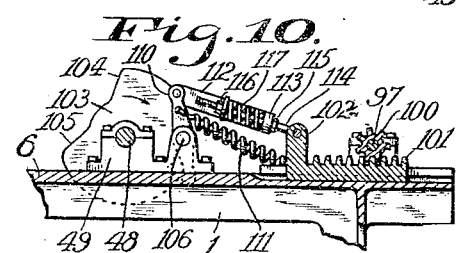
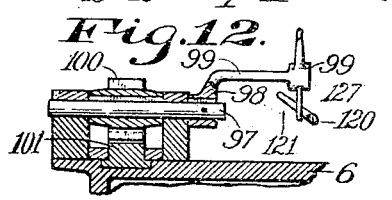
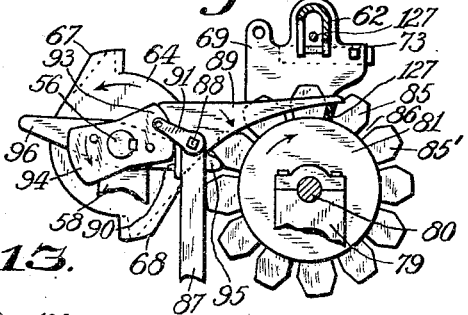
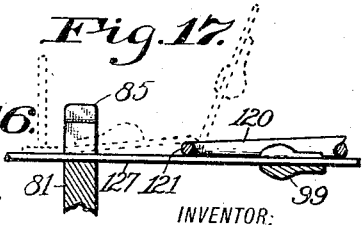
WITNESSES:
J. H. Gardner
M. E. Sparrow
INVENTOR:
Carl A. Porath,
BY
E. T. Silvius
ATTORNEY.

UNITED STATES PATENT OFFICE.

CARL A. PORATH, OF KOKOMO, INDIANA, ASSIGNOR TO RULO S. CONRAD AND GEORGE W. CHARLES, BOTH OF KOKOMO, INDIANA.

BALE-TIE MACHINE.

1,198,761.  Specification of Letters Patent.  Patented Sept. 19, 1916.

Application filed March 29, 1915. Serial No. 17,775.

*To all whom it may concern:*

Be it known that I, CARL A. PORATH, a citizen of the United States, residing at Kokomo, in the county of Howard and State of Indiana, have invented a new and useful Improvement in Bale-Tie Machines, of which the following is a specification, reference being had to the accompanying drawings and to the letters and figures of reference marked thereon.

This invention relates to machines of the type that is designed to form loops on the ends of pieces of wire in the automatic production of bale ties of well-known form, the invention having reference more particularly to various features of such bale-tie machines as that shown and described in Letters Patent No. 816,381, granted March 27, 1906, to G. A. Rumbel, or other machines which may be capable of feeding wire longitudinally, cutting off the wire into lengths, bending one end portion of the wire to form a loop, and twisting portions of the wire together so as to fix the loop securely to the main portion of the tie wire.

An object of the invention is to provide a bale-tie machine of the above-mentioned character that shall be so constructed as to be capable of operation at high speed in order to cheapen the product of the machine.

Another object is to provide improved means for cutting the wire off into proper lengths while the feeding of the wire is stopped, and permitting the machine to be run at high speed.

A further object is to provide improved means for actuating the loop-forming mechanism and permitting high speed of the machine.

A still further object is to provide improvements of the above-mentioned character to the end that the bale ties may be produced in larger quantities by a machine and of superior quality, more especially so as to be free from flattened portions; which machine shall be reliable and not liable to injury when run at high speed, and which shall be durable and economical in use.

With the above-mentioned and other objects in view, the invention consists in an improved bale-tie machine having cushioned feeding apparatus, relatively slow speed multiple shear operating apparatus, improved apparatus for controlling the wire feeding, and improved apparatus for operating and controlling the loop former; and the invention consists also further in the novel parts, and combinations and arrangements of parts, as hereinafter particularly described and further set forth in the appended claims.

Figure 2:
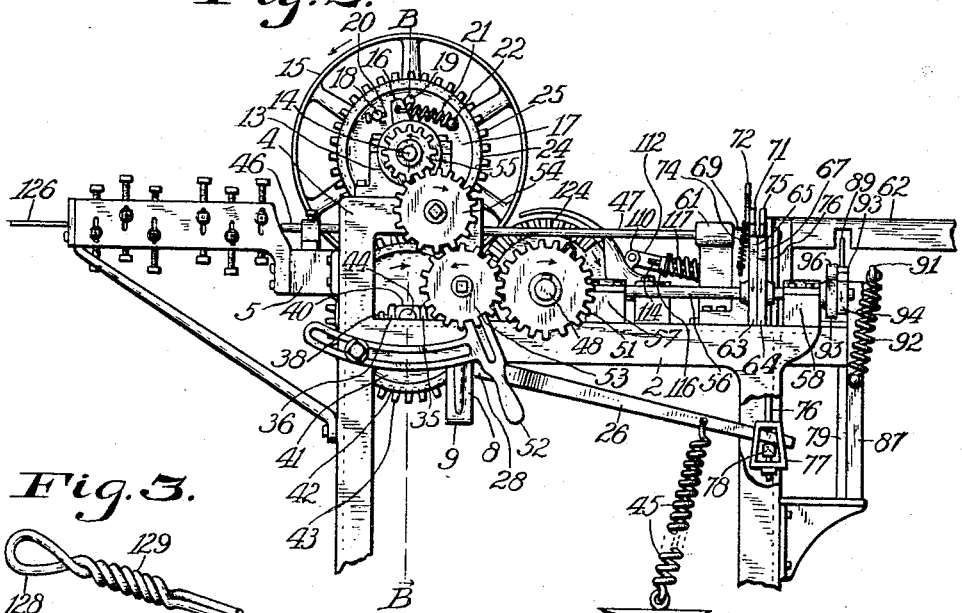
Figure 3:
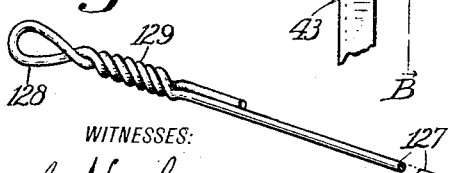

Referring to the drawings,—Figure 1 is a top plan of the machine as preferably constructed, features not directly related to the invention being omitted. Fig. 2 is a side elevation of the machine, the lower portion of the frame of which is broken away. Fig. 3 is a perspective view of a bale tie of the character produced by the machine. Fig. 4 is a side elevation of the machine. Fig. 5 is a fragmentary section approximately on the line A—A on Fig. 1. Fig. 6 is a section on the line B—B on Fig. 2. Fig. 7 is a fragmentary section approximately on the line C—C on Fig. 1. Fig. 8 is a fragmentary section approximately on the line D—D on Fig. 1. Fig. 9 is a top plan of the carrier for one of the feed-wheels. Fig. 10 is a fragmentary section approximately on the line E—E on Fig. 1. Fig. 11 is a fragmentary sectional elevation on the line F—F on Fig. 1. Fig. 12 is a sectional detail of portions of the machine. Fig. 13 is a perspective view of the improved face cam comprised in the invention. Fig. 14 is a perspective view of an arm for driving the opposite one of the feed-wheels. Fig. 15 is a side elevation of an intermittent gear wheel hitherto employed in bale-tie machines. Fig. 16 is an elevation of a bevel pinion operated by the intermittent gear wheel. And Fig. 17 is a fragmentary sectional detail illustrating the manner of bending the wire to form the loops.

Similar reference characters on the different figures of the drawings indicate corresponding elements or features of construction herein referred to in detail.

In practically carrying out the objects of the invention which is applicable to machines that may be variously constructed generally, the various features of the invention may be variously modified or arranged; but for the purpose of fully and clearly describing the invention, the function and mode of operation thereof, the invention is shown as applied to the well-known machine described in the above-mentioned patent.

The main frame comprises two side members 1 and 2 having relatively high portions 3 and 4 on one end of the members respectively, a cross-bar 5 secured to the high portions of the side members, and a top plate 6 fixed on the side members rearward of the higher portions thereof. The frame comprises also a cross-bar having two oppositely arranged vertical members 7 and 8 connected at the lower ends to a cross-bar 9 and provided with lateral members 10 and 11 which are secured respectively to the side members 1 and 2. The relatively high portions 3 and 4 of the frame are provided respectively with journal boxes 12 and 13 in which a main driving shaft 14 is rotatably mounted and provided with a pulley or wheel 15 of suitable construction to receive and transmit motion to the shaft. An arm 16 is provided and is fixedly secured to the shaft 14, and adjacent to the arm a main feed-wheel 17 is rotatively mounted on the shaft 14. One side of the feed-wheel is provided with a suitable stud or stop projection 18 to be engaged by the arm 16 for driving the feed-wheel, the latter preferably having also another stud or projection 19 on the opposite side of the arm, so that the arm extends between the two studs, and one of the studs preferably is provided with an adjusting screw 20 for varying the extent of motion of the arm or the feed-wheel each relatively to the other. A coil spring 21 is provided for periodically advancing the feed-wheel rotatably on the shaft, the spring being connected to the feed-wheel by means of a lug 22 and connected also to the arm 16 by suitable means, preferably a stud 23. The feed-wheel has a smooth cylindrical peripheral portion 24 and also spur teeth 25. The provision of the resilient connection above described between the driving shaft and the main feed-wheel insures uniform feeding of the wire through the machine and prevents weakening of the wire through slippage of the feed-wheel on the wire.

An improved auxiliary feed-wheel carrier is provided which comprises an arm 26 having two branches 27 and 28 that are provided with pivot ears 29 and 30 respectively to constitute a lever, the branches being arranged between the vertical members 7 and 8 of the main cross-bar, the ears being supported on the vertical members by means of pivots 31 and 32 respectively. One branch of the lever has upright guides 33 and 34, the companion branch having similar guides 35 and 36. The guides 34 and 36 are provided with securing screws 37 and 38 respectively. An externally squared journal box 39 is arranged between the guides on one of the branches, a similar box 40 being arranged on the companion branch and secured by the screw. An auxiliary feed-wheel 41 has also a smooth cylindrical peripheral face 42 and spur teeth 43, the feed-wheel being provided with an axle 44 that is rotatably mounted in the boxes 39 and 40, so that the auxiliary feed-wheel is under the main feed-wheel with the teeth of the two feed-wheels intermeshing, the teeth being of sufficient length to permit adjustment of the auxiliary feed-wheel toward or from the main feed-wheel. When the axle 44 wears down the metal of either of the boxes 39 or 40 the box may be turned over in its seat so as to again bring up the axle to the required position, so that the auxiliary feed-wheel may be maintained on one and the same plane of rotation with the main feed-wheel, without requiring the delays incidental to refitting new journal boxes. A spring 45 is connected to the arm portion 26 of the feed-wheel carrier and is suitably supported for yieldingly holding the auxiliary feed-wheel up to the wire being fed through between the feed-wheels. The auxiliary feed-wheel will be periodically lowered in operation of the machine so as to stop the feeding, by means to be hereinafter described.

A tubular guide 46 is supported upon the cross-bar 5 of the main frame for guiding the wire, preferably from straightening apparatus, to the feed-wheels, a similar guide 47 being suitably supported for guiding the wire from the feed-wheels.

A countershaft 48 is rotatably mounted in the journal boxes 49 and 50 supported upon the main frame and has a gear wheel 51 secured thereto. A gear frame 52 is connected to the journal box 13 so as to be radially adjustable about the shaft 14 and it has two intermeshing gear wheels 53 and 54 rotatably mounted thereon, the wheel 53 being in mesh with the wheel 51, the wheel 54 being in mesh with a pinion 55 fixedly secured to the shaft 14. When it is desired to change the speed of the countershaft without changing the speed of the driving shaft, different sized gear wheels may be substituted, as for instance a larger or a smaller wheel may be placed either on the driving shaft or on the countershaft, the length of the bale tie being affected by such change of gearing, as will be understood.

An improved mechanism for controlling the feeding of the wire and the cutting off of the wire into proper lengths includes a shaft 56 which is rotatably mounted in the journal boxes 57 and 58 supported upon the top 6 of the main frame, a bevel gear wheel 59 being secured to the shaft and arranged in mesh with a bevel pinion 60 that is fixedly secured to the countershaft 48. Hitherto in machines of this character the shaft 56 has been driven at the same speed as the countershaft 48 with attendant disadvantages which are now overcome by the improved mechanism which requires that the shaft 56 be driven slower than the countershaft 48.

The rear end of the guide 47 is supported in a boxing 61 from which the wire emerges and enters a guide 62 suitably supported in alinement with the guide 47, the under side of the guide 62 being open to permit descent of the severed sections of wire. The severing operation is performed between the boxing 61 and the guide 62.

An improved cam is provided for controlling the feeding apparatus and the cutting-off apparatus, and preferably comprises two disks 63 and 64 assembled as a single disk on and fixedly secured to the shaft 56. The disk 63 has two cam projections 65 and 66 on its periphery and on opposite sides of the shaft 56. The disk 64 also has two cam projections 67 and 68 on its periphery and they have longer faces than the cam projections 65 and 66. The top 6 of the main frame is provided with a suitable stand 69 having a pivot 70 on which a shear head 71 is mounted so as to tilt, being constructed to constitute a lever of which one portion when at rest is in contact with the periphery of the disk 63 and is engaged and tilted by the cam projections twice on each complete revolution of the shaft 56. A suitable shear blade 72 is secured to the opposite portion of the shear head so as to coöperate with a stationary shear blade 73 which is secured to the stand 69 in proximity to the boxing 61. The shear head is provided with a retracting spring 74 for tilting the head to carry the movable shear blade away from the stationary one. A dog-lever 75 is mounted also on the pivot 70 so as to rest upon the periphery of the disk 64 to be elevated pivotally by the cam projections 67 and 68 twice on each complete revolution of the shaft 56, the dog-lever being held up a longer period of time than the shear head is engaged by its operating cam. A link 76 is connected to the dog-lever and carries a stirrup 77 that supports one end of a lever 78 which is pivotally connected at its opposite end to the side member 1 of the main frame, the lever 78 extending under the arm portion 26 of the auxiliary feed-wheel carrier. It will be seen, therefore, that when the dog-lever 75 is forced upward the carrier is moved on its fulcrum so as to lower the auxiliary feed-wheel away from the wire, the feeding of the wire thus being stopped while the wire is severed by the shear blade 72.

The patented machine above referred to includes a standard 79 suitably supported by the main frame and rotatably supporting one end portion of a shaft 80 on which is fixedly secured a detaining-head 81 and its companion separating wheel 82 and also a conveying wheel 83, a suitable number of troughs 84 being suitably mounted on the shaft to receive the severed sections of wire and discharge the completed bale ties, or the bale ties may be otherwise discharged if preferred. The detaining-head 81 has radially extending projections 85, 85', with a space or slot 86 between each two projections to receive and hold the wires while being twisted. The adjacent sides of the projections are inclined so that they may be engaged as gear teeth for rotating the shaft 80 and the appliances thereon. Another standard 87 is supported by the main frame and supports a pivotal shaft 88. A depressing-arm 89 is fixed on the shaft 88 for drawing the wire sections from the guide 62 to the spaces 86 and momentarily holding the wires in the spaces, and it has a cam face 90 for its operation. The shaft 88 is provided with an operating arm 91 which is drawn by means of a spring 92 connected thereto and to the standard 87 for swinging the depressing-arm upward. In order to force the depressing-arm downward, two integrally formed cams 93 and 94 are fixedly secured to the shaft 56 and are adapted to successively engage the cam face 90 and pass by the same after operating the depressing-arm, so that the depressing-arm is actuated twice on each revolution of the shaft 56. In order to impart rotative movement to the detaining-head 81, two integrally connected arms 95 and 96 are fixedly secured to the shaft 56 and are adapted to successively enter the spaces and engage the projections on the detaining-head, so that the detaining-head is slightly turned twice on each revolution of the shaft 56. By this construction smooth action is obtained and the objections to jerking movement obviated.

The loop-forming operations may be performed by the means heretofore provided which comprises a shaft 97 rotatively supported upon the top 6 of the main frame, the shaft having a crank arm 98 thereon that carries a wire-bender 99, a pinion 100 being secured to the shaft and meshing with a rack-bar 101 longitudinally guided on the top 6. The rack-bar in the present case is provided with a lug 102. Improved means for operating the rack-bar to control the wire-bender include a face cam 103 fixedly secured to the countershaft 48 and having a gap in its peripheral portion so as to form a receding cam face 104 from which extends a projecting-face 105. A pivot 106 is suitably supported in proximity to the cam. A lever is supported between its ends on the pivot, one arm 107 of the lever extending downward and having a crank pin 108 thereon to be operated by the cam, the crank pin preferably having a roller 109 thereon that is directly in contact with the periphery of the cam or with either of the cam faces. The cam has a cylindrical peripheral face excepting in the gap. The opposite arm 110 of the lever extends upward and has a spring 111 connected thereto for maintaining the roller in contact with the cam, the spring being connected to the main frame. A cushioned connecting-rod is provided which comprises a main rod 112 that is pivotally connected at one end to the arm 110 and has a guide lug 113 on one side of its opposite end. A relatively movable rod 114 is connected to the lug 102 of the rack-bar and extends through the guide lug 113, being stopped by an adjusting nut 115 on the rod 114 at the outer side of the guide lug 113. The rod 114 has an adjusting nut 116 thereon, and it has also a coil spring 117 thereon between the adjusting nut and the guide lug 113, so that when the arm 107 is forced by the cam face 105 to draw the rack-bar toward the cam, while the lever is rapidly moved it may be started slightly in advance of the rack-bar, injurious results due to sudden starting and rigid connection between the cam and the rack-bar being obviated.

For the purpose of twisting the wire after it is bent to form a loop, similar mechanism to that heretofore employed may be adopted in construction, the same comprising a shaft 118 rotatably supported upon the top 6 of the frame and having a head 119 on its rear end which carries an arm 120 having a lateral finger 121 around which to bend the wire and by which the wire is subsequently twisted. A pinion 122 is secured to the shaft 118 and has a guide block 123 thereon, the pinion being periodically rotated by contact with an intermittent gear wheel 124 that is secured to the countershaft 48 and has a guide bar 125 thereon that is engaged by the guide block 123 when the teeth of the pinion are not in contact with the teeth of the gear wheel.

It should be understood that the various parts of the invention are not limited to the precise shapes shown and also that various parts of the machine may be variously modified within the scope of the accompanying claims.

The operation of bale tie machines of the herein-described character being well understood, it is only necessary to describe intermediate results attained by the operation of the improved parts of the machine. It will be understood that the driving shaft 14 is continuously rotated and therefore the feed-wheels are continuously driven thereby. Assuming that the auxiliary feed-wheel is lowered and that the wire 126 extends through its guides and between the feed-wheels, the wire is at rest, the dog-lever 75 being lifted by one of the cams on the disk 64. While the dog-lever is elevated the shear head 70 is tilted over by one of the cams on the disk 63 and permitted to be retracted after severing the wire, following which the dog-lever is dropped and permits the spring 45 to tilt the carrier and elevate the auxiliary feed-wheel 41 to the wire. When the auxiliary feed-wheel is lowered the main feed-wheel 17 is drawn forward by means of the spring 21 and the arm 16. When the feed-wheel 41 is forced upward into contact with the wire, the wire being tightly clamped between the feed-wheels, the resistance of the wire is greater than the spring 21, so that the arm 16 is permitted to advance slightly without turning the feed-wheels while the proper pressure is being applied by the feed-wheels to the wire, following which the arm 16 comes into contact with the projection 18 or its adjusting screw 20 and causes rotation of the feed-wheels which advance the wire without slipping thereon. The adjustment may be such that the tension of the spring 21 may be sufficient to enable the spring to rotate the main feed-wheel slightly before the arm engages the projection on the feed-wheel, so that the feed-wheels gradually begin their movement. In either case the feed-wheels are not in motion at the moment of engaging the wire, so that slipping of the feed-wheels on the wire before sufficient pressure on the wire is exerted to feed the wire, is avoided. The driving shaft 14 is rotated at much greater speed than has been hitherto possible in a machine of the above-described character, and therefore the countershaft 48 is rotated at relatively greater speed than hitherto while the speed of the shaft 56 remains approximately the same as heretofore; but while the feeding of the wire is greatly increased in speed, although the shaft 56 runs relatively slow, the wire-cutting and the feed-controlling mechanisms are operated to correspond to the speed of the main shaft by means of the improved multiple cams on the relatively slow shaft 56. Also the wire-bending apparatus is safely operated by means of the improved cam 103 and the cushioned connections between the cam and the rack-bar 101. The wire having been severed, a tie rod 127 is formed of suitable length and a loop 128 formed thereon, after which a twist 129 is formed to complete the bale tie. The output of the improved machine is approximately double that of the bale-tie machine hitherto used.

Having thus described the invention, what is claimed as new is—

1. A bale-tie machine including a continuously rotatable driving shaft, a rotatable main feed-wheel, a rotatable auxiliary feed-wheel movable toward the main feed-wheel to engage a wire, and means enabling the shaft to start and rotate the main feed-wheel to feed the wire.

2. A bale-tie machine including a rotatable driving shaft, a rotatable main feed-wheel, a rotatable auxiliary feed-wheel movable toward the main feed-wheel to press a wire between the feed-wheels, and a cushioned driving connection between the shaft and the main feed-wheel.

3. A bale-tie machine including a stationary shear blade, a movably supported shear head, a shear blade secured to the head, a rotatable shaft, a wheel secured to the shaft and having a plurality of cam projections thereon for repeatedly engaging the shear head and operating the shear blade thereon during each complete revolution of the shaft.

4. A bale-tie machine including a rotatable shaft, a face cam secured to the shaft, a movable wire-bender, and gearing operatively connected with the wire-bender for actuation thereof and including a movable contact device having contact with the face cam, the contact device being provided with a supported spring for holding it in contact with the face cam.

5. A bale-tie machine including a rotatable shaft, a face cam secured to the shaft, a movable wire-bender, gearing for actuating the wire-bender, and a pivotally-movable contact device having contact with the face cam to be moved thereby and provided with a cushioning connection with the gearing for enabling the device to actuate the gearing following slight pivotal movement of the device.

6. A bale-tie machine including a rotatable driving shaft, an arm fixedly secured to the shaft, a main feed-wheel rotatably mounted on the shaft and having a stop device thereon to be engaged by the arm for rotating the feed-wheel, and a spring connected to the arm and the feed-wheel for periodically advancing the latter on the shaft to carry the stop device forward from the arm.

7. A bale-tie machine including two cooperating feed-wheels, one of the feed-wheels having an engagement device thereon, a rotatable shaft having an arm for engaging the device to rotate the feed-wheel, and means automatically acting to rotate the feed-wheel faster than the shaft to carry the device away from the arm when feeding resistance is removed from the feed-wheels.

8. A bale-tie machine including a rotatable main feed-wheel, a pivotally supported carrier comprising a lever having two branches provided each with two oppositely supported guides, two journal boxes reversibly secured between the guides of the two branches respectively, and an auxiliary feed-wheel having an axle rotatably mounted in the two journal boxes to be moved thereby toward or from the main feed-wheel.

9. A bale-tie machine including two cooperating feed-wheels, one of the feed-wheels having two engagement devices thereon, a rotatable shaft for driving the feed-wheel, an arm fixed on the shaft and extending between the two engagement devices, and a spring connected to the arm and the feed-wheel for turning the feed-wheel to carry one of the devices from the arm and the other of the devices to the arm.

10. A bale-tie machine including a main feed-wheel having a driving shaft rotatable relatively thereto, an auxiliary feed-wheel rotatable opposite to the main feed-wheel, means for yieldingly forcing one of the feed-wheels toward the other to press a wire between them, and means automatically acting, on rotation of the driving shaft, for rotating the main feed-wheel following the pressing of the wire between the two feed-wheels.

11. A bale-tie machine including a rotatable driving shaft, an adjustably supported carrier, a main feed-wheel rotatively mounted on the driving shaft, an auxiliary feed-wheel rotatably mounted on the carrier and geared to the main feed-wheel, and a resilient connection between the driving shaft and the main feed-wheel for enabling the shaft on rotation in the feed-wheel to subsequently rotate the feed-wheel.

12. A bale-tie machine including a rotatable driving shaft, a main feed-wheel rotatable on the shaft and having two stop devices thereon, one of the devices being adjustable relatively to the other, an arm fixedly secured to the shaft and extending between the two stop devices, a spring connected to the arm and the feed-wheel and yieldingly holding one of the stop devices to the arm, the arm being movable to the opposite one of the stop devices for rotating the feed-wheel when retarding influence is applied to the feed-wheel.

13. A bale-tie machine including a pair of rotatable wheels for feeding a wire, a driving shaft for rotating the wheels, a counter-shaft geared to the driving shaft, wire-bending mechanism and also twisting mechanism operatively connected with the counter-shaft to be actuated once on each complete revolution of the counter-shaft, movable wire-shearing apparatus, a movable retaining-head, a movable compression arm, and movable co-acting mechanism operatively connected with the counter-shaft and constructed for periodically stopping the feeding of the wire and moving the wire-shearing mechanism and the retaining head and also the compression-arm repeatedly on each complete revolution of the counter-shaft.

14. In a bale-tie machine, the combination with a rotatable driving shaft, an auxiliary feed-wheel, and a carrier adjustably supported and rotatably supporting the feed-wheel below the shaft, of an arm fixedly secured to the driving shaft, a main feed-wheel rotatively mounted on the shaft adjacent to the arm to coöperate with the auxiliary feed-wheel for feeding a wire, the main feed-wheel having a projection thereon opposite one side of the arm to be engaged by the arm for driving the feed-wheel, a spring connected to the feed-wheel and the arm for rotating the feed-wheel forward on the shaft to carry the projection away from the arm, a second projection fixed on the feed-wheel to be carried to the opposite side of the arm on rotation of the feed-wheel on the shaft, and means for adjustably limiting the relative movement of the arm between said projections.

15. In a bale-tie machine, the combination with wire-feeding mechanism, a movable shear head, a movable dog-lever for controlling said mechanism, and a rotatable shaft, of a shear-controlling disk fixedly secured to the shaft and having a cam projection on one side and also a cam projection on the diametrically opposite side of the shaft, said projections being movable successively into engagement with the shear head, for repeatedly operating the head on each complete revolution of the shaft; and a dog-lever controlling disk fixedly secured also to said shaft and having a cam projection on one side and also a cam projection on the diametrically opposite side of the shaft to be moved in succession into engagement with the dog-lever, for repeatedly actuating the dog-lever on each complete revolution of said shaft.

16. In a bale-tie machine, the combination with a movably supported wire-bender, gearing including a reciprocatory rack-bar for operating the wire-bender, means for holding the bent wire, a rotatable shaft, and wire-twisting mechanism operatively connected with the shaft to coöperate with the wire-bender and the holding means, of a cam fixedly secured to the shaft, a lever pivotally supported between its ends and having an arm in contact with the cam for pivotally moving the lever in one direction, a connecting rod comprising a main part that is connected to the lever and a second part that is connected to the rack-bar, and comprising also a spring under compression between portions of said two parts, and a supported spring connected to the lever for moving the lever in the opposite direction to the cam.

17. In a bale-tie machine, the combination with means for feeding a wire, means for severing the wire into lengths, a rotatable detaining-head having slots therein to receive the severed wire, means for forming a loop on the wire, and means for twisting the wire when in a slot, of a shaft rotatably supported and operatively connected with the feeding means, and a plurality of arms fixedly secured to the shaft and movable radially into and out of the slots successively for rotatably moving the detaining-head repeatedly on each complete revolution of the shaft.

18. In a bale-tie machine, the combination with a rotatable driving shaft, a main feed-wheel on the shaft to be driven thereby, an auxiliary feed-wheel, a pivoted carrier for the auxiliary feed-wheel constructed for moving the auxiliary feed-wheel toward or from the main feed-wheel, a movably supported dog-lever, and a connection between the carrier and the dog-lever, of a disk rotatably supported and operatively connected with the driving shaft, the disk having a plurality of cam projections thereon for repeatedly actuating the dog-lever on each complete revolution of the disk.

19. In a bale-tie machine, the combination with means for feeding a wire, means for severing the wire into lengths, a rotatable detaining-head having slots therein to receive the severed wire, and a depressing-arm pivotally supported to force the wire into a slot, of a shaft rotatably supported and operatively connected with the feeding means, and a plurality of cams fixedly secured to the shaft for repeatedly actuating the depressing-arm on each complete revolution of the shaft.

20. In a bale-tie machine, the combination with means for feeding a wire, means for intermittently stopping the feeding of the wire, and a movable shear for severing the wire when feeding thereof is stopped, of a disk rotatably supported and operatively connected with the wire-feeding means, the disk having a plurality of cam projections thereon for repeatedly actuating the movable shear on each complete revolution of the disk.

In testimony whereof, I affix my signature in presence of two witnesses.

CARL A. PORATH.

Witnesses:
 JOSEPH C. HERRON,
 GOLDIE SNYDER.

Copies of this patent may be obtained for five cents each, by addressing the "Commissioner of Patents, Washington, D. C."